United States Patent

Knapp et al.

[11] Patent Number: 5,603,454
[45] Date of Patent: Feb. 18, 1997

[54] WATER DISPLAY PENDANT WATER DROPPER

[75] Inventors: William Knapp, Menlo Park; Mark Fuller, Studio City, both of Calif.

[73] Assignee: Wet Design, Universal City, Calif.

[21] Appl. No.: 285,621

[22] Filed: Aug. 2, 1994

[51] Int. Cl.⁶ .............................. F16K 31/12; B05B 17/08
[52] U.S. Cl. .............................. 239/17; 239/569; 251/61.1
[58] Field of Search .................................. 239/16–18, 20, 239/22, 23; 251/61.1, 30.01; 222/422, 544, 563

[56] References Cited

U.S. PATENT DOCUMENTS

| | | | |
|---|---|---|---|
| 3,022,977 | 2/1962 | Jones | 251/61.1 |
| 4,294,406 | 10/1981 | Pevnick | 239/20 |
| 4,787,408 | 11/1988 | Twerdochlib | 251/61.1 |
| 5,348,270 | 9/1994 | Dinh | 251/61.1 |
| 5,381,956 | 1/1995 | Robinson et al. | 239/17 |

FOREIGN PATENT DOCUMENTS 2079898  1/1982  United Kingdom ................. 251/61.1

*Primary Examiner*—Andres Kashnikow
*Attorney, Agent, or Firm*—Blakely Sokoloff Taylor & Zafman

[57] ABSTRACT

A balloon valve that can control the flow of a display fluid through the supply pipe of a water display. The supply pipe is typically suspended from a structure and releases a slug of water into a pool. The pipe is located at a distance from the pool so that the water slug breaks up into a rain shower. The balloon valve includes an inflatable hose located within the supply pipe and coupled to a source of pressurized working fluid. The flow of working fluid into the balloon valve is controlled by a control valve. When the control valve is in a first state, working fluid flows into the balloon valve to expand the hose. The hose is expanded to completely fill a portion of the pipe and prevent the display fluid from flowing through the pipe. When the control valve is in a second state, the balloon valve is deflated so that the display fluid can again flow through the supply pipe and out of the display. The balloon valve is rapidly deflated and inflated to create a slug of water that falls out of the pipe and burst into a rain shower.

6 Claims, 2 Drawing Sheets

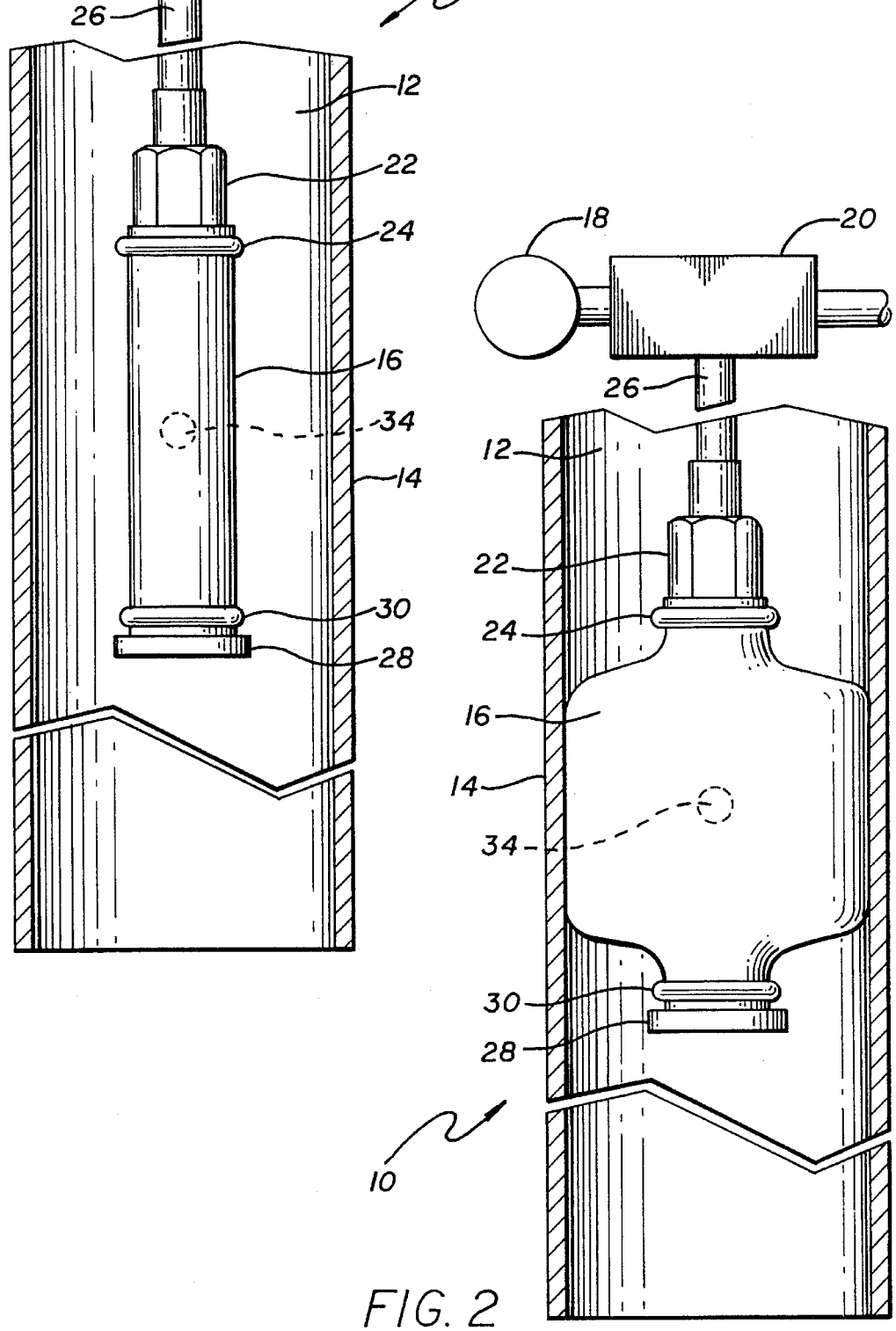

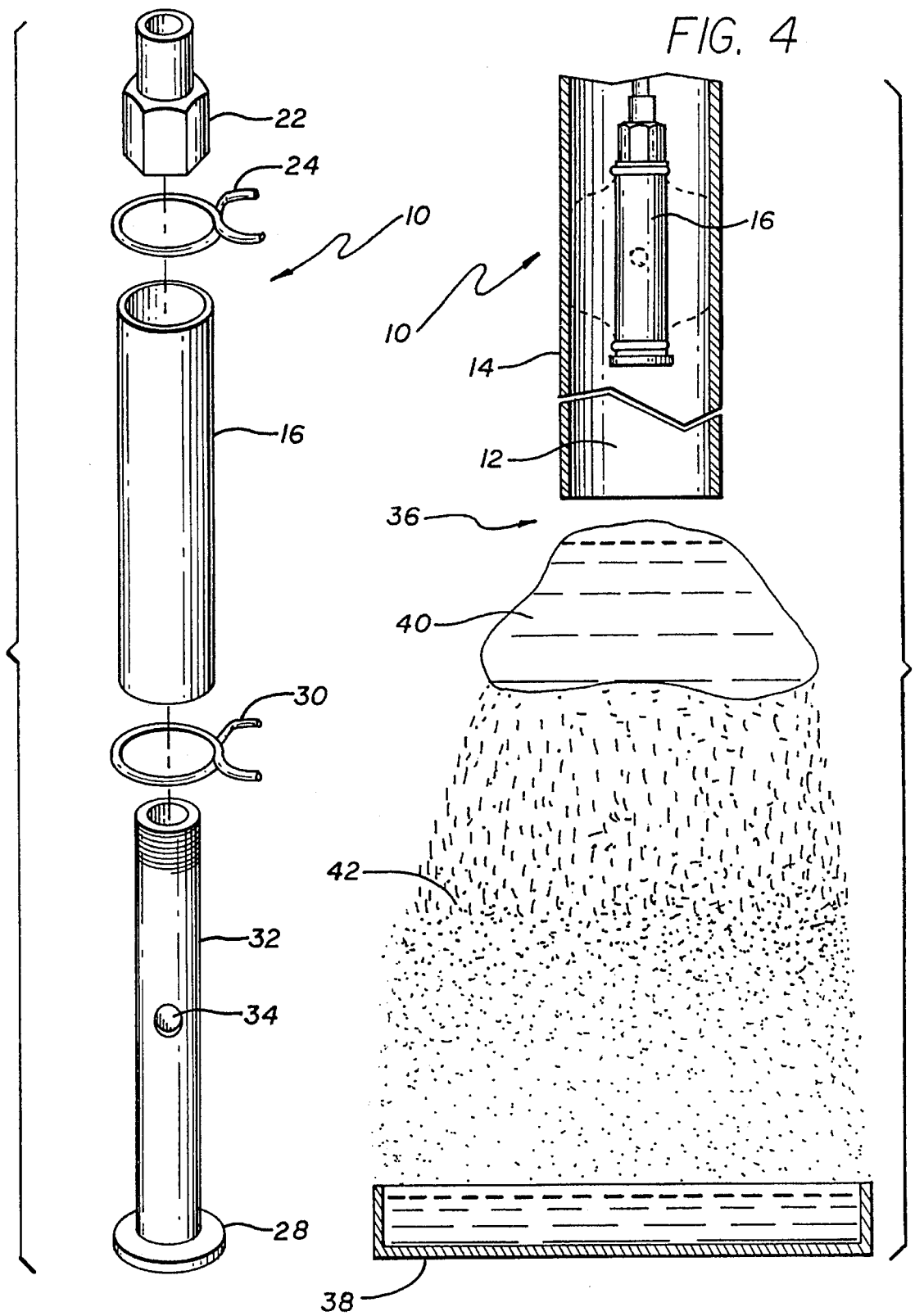

WATER DISPLAY PENDANT WATER DROPPER

BACKGROUND OF THE INVENTION

1. Field of the Invention

The present invention relates to a balloon valve for a water display.

2. Description of Related Art

Water displays are sometimes installed into a structure to improve the aesthetic appearance of the building. Water displays include fountains that emit a stream of water from an orifice located within a structure such as a statue. Ancient water fountains relied on gravity to feed the water to the orifice. Later pumps and valves were developed to redirect water to the fountain structure. The pumps and valves can be controlled by a computer to periodically emit streams or slugs of water. Such displays are typically more amusing to watch than conventional water fountains.

For example, U.S. Pat. No. 4,978,066 issued to Fuller et al, discloses a water display that contains a plurality of nozzles that intermittently project streams of water. The flow of water through the nozzles is controlled by solenoid control valves that are energized and de-energized by a computer. Conventional solenoid control valves typically contain spools or other valve members that have a relatively small orifice. Such control valves are thereby unable to control a relatively large mass of water. Increasing the size of the solenoid valve will increase the mass and corresponding inertia of the valve. Increasing the inertia will typically reduce the response time of the valve and reduce the accuracy of controlling the flow of water. It would be desirable to provide a valve that has a relatively quick response time and is capable of controlling the flow of a large mass of water. It would also be desirable to have a water display that can quickly and accurately generate relatively large slugs of water.

SUMMARY OF THE INVENTION

The present invention is a balloon valve that can control the flow of a display fluid through the supply pipe of a water display. The supply pipe is typically suspended from a structure and releases a slug of water into a pool. The pipe is located at a distance from the pool so that the water slug breaks up into a rain shower. The balloon valve includes an inflatable hose located within the supply pipe and coupled to a source of pressurized working fluid. The flow of working fluid into the balloon valve is controlled by a control valve. When the control valve is in a first state, working fluid flows into the balloon valve to expand the hose. The hose is expanded to completely fill a portion of the pipe and prevent the display fluid from flowing through the pipe. When the control valve is in a second state, the balloon valve is deflated so that the display fluid can again flow through the supply pipe and out of the display. The balloon valve is rapidly deflated and inflated to create a slug of water that falls out of the pipe and burst into a rain shower.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a side view of a deflated balloon valve of the present invention within the supply pipe of a water display;

FIG. 2 is a side view of the balloon valve in an inflated position;

FIG. 3 is an exploded view of the balloon valve;

FIG. 4 is a perspective view of the balloon valve within a water display.

DETAILED DESCRIPTION OF THE INVENTION

Referring to the drawings more particularly by reference numbers, FIG. 1 shows a balloon valve 10 of the present invention. The balloon valve 10 is used to control the flow of a fluid through the inner channel 12 of a pipe 14. As shown in FIG. 2, the balloon valve 10 has an inflatable member 16 that can be rapidly expanded to fill a portion of the inner channel 12 and block any fluid from flowing through the pipe 14. Deflating the inflatable member 16 reduces the diameter of the member 16 and allows fluid to flow through the channel 12.

The balloon valve 10 is coupled to a source of pressurized working fluid 18 by a control valve 20. The pressurized working fluid 18 is typically a high pressure air. The control valve 20 is preferably a normally open 3-way solenoid valve. When the solenoid is de-energized, air is allowed to flow into the balloon valve 10 and inflate the inflatable member 16. When the solenoid is energized, the flow of air to the balloon valve 10 is terminated and the inflatable member 16 is vented to atmosphere, allowing the member 16 to deflate and fluid to flow through the pipe 14. The pressure of the air is relatively high so that the inflatable member 16 rapidly expands and discontinues the flow of fluid through the pipe 14. Likewise, the stiffness of the inflatable member 16 is also relatively high so that the member 16 rapidly contracts when the valve 10 is vented to atmosphere. The balloon valve 10 of the present invention can thus provide relatively fast response times in valving the flow of fluid through the pipe 14, and improve the accuracy of creating water slugs from the pipe 14.

FIG. 3 shows a preferred embodiment of a balloon valve 10 of the present invention. The inflatable member 16 of the valve 10 is typically a rubber hose that is clamped to the end of a pipe fitting 22 by a first clamp 24. The fitting 22 couples the hose 16 to a tube 26 that extends through the inner channel 12 of the pipe 14, and is in fluid communication with the pressurized fluid source 18 through control valve 20. The other end of the hose 16 is clamped to an end cap 28 by a second clamp 30. The end cap 28 preferably has a hollow shank member 32 that screws into the fitting 22. The shank member 32 has an opening 34 to provide fluid communication between the tube 26 and the hose 16. The end cap 28 fixes the length of the hose 16 and prevents any axial hose expansion when the working fluid is introduced to the valve 10. Preventing axial growth of the hose 16 insures a more rapid radial expansion of the inflatable member 16 and provides a balloon valve with a relatively quick response time. Limiting the axial deflection of the hose 16 also minimizes the amount of air required to adequately fill and expand the valve 10.

FIG. 4 shows the balloon valve 10 incorporated into a water display 36. The pipe 14 is typically suspended from a structure such as the ceiling or roof of a building and coupled to a source of water. The source of water is typically a municipal water source. By way of example, the display may be installed into the open area of an airport or a shopping mall.

The display 36 is typically suspended above a pool 38 which captures the water released by the pipe 14. The pipe 14 has a relatively large diameter, so that the display releases a large slug of water 40. The pipe 14 has a significantly larger inner diameter than the outer dimensions of the deflated hose 16 so that a relatively large mass of water can flow past the valve 10 and out of the pipe 14. The pipe 14 is located at a distance from the pool sufficient to allow the water slug 40 to break up into a bundle of water droplets 42, thereby creating a "rain shower" In the preferred embodiment, the pipe 14 is located at least 15 feet above the pool 38. The valve 10 is located at the end of the pipe. The present invention provides a valve that can control the flow of water through the pipe without degrading the overall visual appearance of the display.

In operation, the solenoid control valve 20 is de-energized and the pressurized air flows into the balloon valve 10 to inflate the hose 16 and prevent the display fluid from flowing through the pipe 14. When it is desirable to release water from the display, the solenoid control valve 20 is energized and the balloon valve 10 is vented to atmosphere, wherein the hose 16 is deflated and the display fluid can flow through the pipe 14 and out of the display. The display emits a slug of water which eventually breaks up into a rain shower that falls into the pool 38. After the water slug is emitted by the display, the control valve 20 is de-energized to inflate the balloon valve 10 and prevent water from flowing through the pipe 12. The process of energizing and de-energizing the control valve 20 can be repeated to create a series of rain showers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A water display that is connected to a source of pressurized working fluid, comprising:
    a pipe with an inner channel that can transport a display fluid, said water pipe being suspended from a structure;
    an inflatable valve that can be inflated with a working fluid to close said inner channel and prevent fluid from flowing through said pipe, and deflated to allow the display fluid to flow through said pipe;
    a control valve that provides fluid communication between said inflatable valve and the source of pressurized working fluid to inflate said inflatable valve when said control valve is in a first state, and vents and deflates said inflatable valve when said control valve is in a second state, wherein said inflatable valve rapidly deflates and inflates to create a slug of fluid that is released from said pipe; and,
    a pool located below said pipe.

2. The water display as recited in claim 1, wherein said inflatable valve includes an inflatable member coupled to a tube and an end cap by a pair of clamps, said tube being coupled to the pressurized fluid source to provide fluid communication between said inflatable member and the pressurized working fluid source.

3. The water display as recited in claim 2, wherein said inflatable member is an elastic hose.

4. The water display as recited in claim 2, wherein said end cap is attached to said tube to limit an amount of axial displacement of said inflatable member when said inflatable member is inflated.

5. The water display as recited in claim 4, wherein said end cap is attached to said tube by a hollow shank member which has an opening that provides fluid communication between said tube and said inflatable member.

6. The water display as recited in claim 1, wherein said control valve is a normally open 3-way solenoid valve.

* * * * *